United States Patent [19]
Whetstone

[11] Patent Number: 5,043,208
[45] Date of Patent: Aug. 27, 1991

[54] CONTINUOUS MULTI-FILAMENT POLYESTER SUBSTRATE READILY ADHERABLE TO A VINYL SHEET

[75] Inventor: James H. Whetstone, Greensboro, N.C.

[73] Assignee: Unifi, Inc., Greensboro, N.C.

[21] Appl. No.: 534,186

[22] Filed: Jun. 6, 1990

Related U.S. Application Data

[62] Division of Ser. No. 262,538, Oct. 25, 1988, Pat. No. 4,935,293.

[51] Int. Cl.⁵ .............................................. D03D 3/00
[52] U.S. Cl. ................................... 428/229; 428/247; 428/253; 428/255; 428/265; 428/280; 428/246
[58] Field of Search ............... 428/229, 253, 255, 265, 428/296, 247, 280

[56] References Cited

U.S. PATENT DOCUMENTS

| | | | |
|---|---|---|---|
| 3,301,740 | 1/1967 | Stiehl et al. | 428/247 |
| 3,531,365 | 9/1970 | Melin | 428/265 |
| 4,196,244 | 4/1980 | Roman | 428/247 |
| 4,246,311 | 1/1981 | Hirst | 427/210 |
| 4,284,681 | 8/1981 | Tidmarsh et al. | 428/253 |
| 4,460,643 | 7/1984 | Stevens et al. | 428/284 |
| 4,764,412 | 8/1988 | Burns et al. | 428/253 |

*Primary Examiner*—James J. Bell
*Attorney, Agent, or Firm*—Rhodes, Coats & Bennett

[57] ABSTRACT

A textured, continuous, multi-filament polyester yarn or fabric has a plasticizer incorporated onto the surface thereof and/or into the interfilamentary structure thereof either during the texturizing process or after the yarn has been made into a gauze-like fabric substrate. Because of the plasticizer, the gauze is enabled to be laminated to a vinyl sheet as it is formed. The plasticizer is characterized in that it is compatible with both the vinyl and the polyester, it softens the vinyl to receive the polyester gauze, it has a viscosity in the range of 25–105 centistokes (cs), and it swells or plasticizes the vinyl to such an extent that the polyester gauze becomes imbedded therein and affixed thereto to effectively bond the gauze to the vinyl. The gauze fabric substrate, when laminated to the vinyl sheet material, gives the vinyl sheet both enhanced strength and stability.

5 Claims, 1 Drawing Sheet

CONTINUOUS MULTI-FILAMENT POLYESTER SUBSTRATE READILY ADHERABLE TO A VINYL SHEET

This application is a division of application Ser. No. 262,538, filed Oct. 25, 1988 now U.S. Pat. No. 4,935,293.

BACKGROUND AND SUMMARY OF THE PRESENT INVENTION

The present invention is directed to substrates for vinyl products, and more specifically to a gauze substrate formed of a synthetic continuous, multi-filament, polyester yarn which is so treated as to effectively bond to vinyl sheet material.

Products such as vinyl upholstery and vinyl sheet material conventionally have laminated thereto a gauze substrate in order to provide the necessary strength and stability. The gauze substrate is imbedded in the surface of the vinyl, to form a laminated product. Ordinarily, synthetic, continuous, multi-filament, polyester yarn has a surface energy that resists bonding to vinyl materials in a laminating process.

As a result, gauze substrates are conventionally woven or knit from a spun yarn formed principally of cellulosic fibers such as cotton or formed from spun polyester. As used herein, the term "principally" or "primarily" means 50% or greater. These fibers are generally compatible with a vinyl laminating operation. There are, however, several objections to cotton and/or spun polyester, but before the present invention, no satisfactory solutions to the problems or objections had been developed. The problems or objections are, first, that spun yarns, regardless of the material, are relatively expensive as compared with a gauze formed of textured, continuous, multi-filament polyester yarn. The steps involved in forming a spun yarn are several and significantly increase the cost thereof. Spun yarns, whether they be cellulosic or polyester, also tend to include more defects than textured yarns, also making the processing more difficult. Further, it is difficult to weave high cellulosic content yarns (cotton) on modern, economical high speed, fluid jet looms (water or air). In the case of water jet looms, the yarn tends to swell in the present of the water and is therefore difficult to weave. Therefore, a substrate formed of a continuous, multi-filament, polyester yarn would be preferable, because the objections set forth hereinabove would be obviated.

Some examples of polyester or other polymeric fibers (not continuous, multi-filament yarns) formed into a non-woven mat or web and used as a backing or base for vinyl products are described in U.S. Pat. Nos. 4,560,643 and 4,246,311. However, the polyester or polymeric fibers in these illustrations are formed into a non-woven web or batt and impregnated with a latex binder. This is also a relatively expensive procedure leading to a different type of vinyl product. The polyester gauze substrate envisioned by the present invention is altered to be compatible with the vinyl so that it will adhere thereto in the laminating process.

Previous attempts to use gauze formed of knit or woven continuous, multi-filament polyester yarns as a substrate for vinyl have failed because the surface tension of the continuous, multi-filament polyester yarn is such that the vinyl and polyester will not bond sufficiently to pass a 3.5 pound pull strength test.

Because of the tremendous savings potential to be realized from the use of woven continuous, multifilament, polyester gauze, however, efforts have continued to overcome the problem attendant to the use of continuous, multi-filament, polyester yarn, thereby adapting up to 100% continuous, multi-filament polyester yarn for use in such gauze substrates. First, the advent of texturizing processes which have resulted in non-shrink polyester has encouraged applicant to address more seriously the polyester/vinyl bonding question. After further investigation, it has been found that the addition of certain selected plasticizers to textured, continuous, multi-filament polyester yarn or gauzes made therefrom softens the vinyl, when heat is applied, and makes the vinyl more flowable and tacky to the extent that it will accept and hold the polyester gauze.

The present invention, therefore, is directed to the addition of a plasticizer to the polyester yarn or gauze which will, under the conditions of heat and pressure utilized in laminating the vinyl and polyester gauze, cause the vinyl material to soften and flow to better receive and hold the polyester gauze. Such plasticizers include diesters of fatty acids (and diacids) and short chain alcohols (plus diols); and ethoxylated alkyl aryl alcohols. The plasticizer is applied to the polyester yarn or gauze, so that when heat and pressure are applied, the bonding occurs. The polyester yarn or gauze then serves as a carrier or reservoir for the plasticizer.

It is, therefore, an object of the present invention to provide improved vinyl sheet products.

Another object of the present invention is to provide a substrate for vinyl products of the type described which substrate is formed of textured, continuous, multi-filament polyester yarn and will easily bond to a vinyl surface in the presence of heat and pressure as in a laminating process.

It is yet another object of the present invention to provide a substrate formed of polyester yarns of the type described and so treated as to impart a softening effect on the vinyl surface to which it is applied.

It is another object of the present invention to form a polyester gauze substrate which has plasticizing characteristics built thereinto to the extent that it will easily bond to a vinyl material during a laminating operation.

It is yet a further object of the present invention to provide a textured, continuous, multi-filament polyester yarn that has a plasticizer incorporated therein which facilitates the laminating of any fabric containing the polyester yarn with a vinyl material.

Other objects and a fuller understanding of the invention will become apparent from reading the following detailed description of a preferred embodiment along with the accompanying drawings in which.

DETAILED DESCRIPTION OF THE PREFERRED EMBODIMENT

Turning now to the drawings, there is described the present invention which has several aspects. First of all, there is provided an improved textured, continuous, multi-filament polyester yarn having a plasticizer incorporated therein which makes the polyester yarn bond to vinyl materials under conditions of heat and pressure; there is provided also an improved substrate which is formed predominantly of texturized polyester yarns and which is so treated as to satisfactorily adhere to vinyl products in a laminating operation; and there is provided a unique vinyl product which utilizes a predominantly polyester gauze substrate embedded in, adhered to, or laminated to the rear surface thereof. In general, the common concept which links the foregoing aspects together is the use of a plasticizer which makes polyester bond to vinyl in the presence of heat and pressure. The plasticizer may be applied to a textured, continuous, multi-filament polyester yarn during the texturizing process or to the gauze fabric after it is formed. The resulting substrate has the unique feature of adhering to vinyl sheet material during a laminating operation, whereas polyester gauze previously would not so bond.

Figure 2:
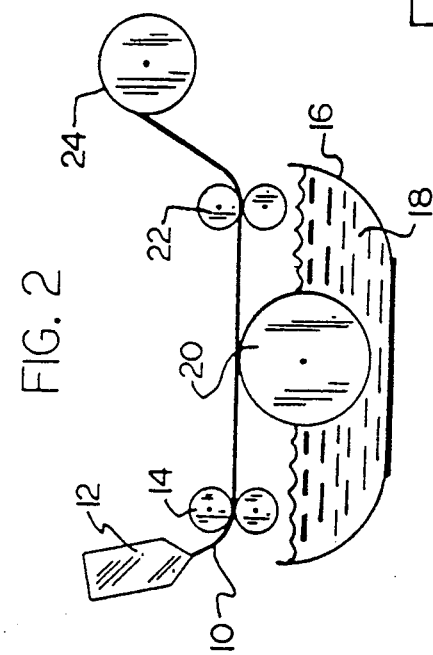
FIG. 2 is a schematic representation of a texturizing process which includes a means for applying a chemical treatment according to the present invention.
Figure 1:
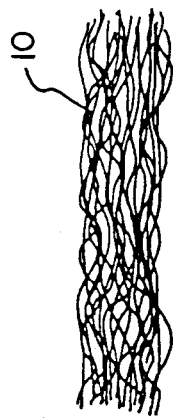
FIG. 1 is schematic representation of a continuous, multi-filament, textured polyester yarn.

The first step in accomplishing the invention according to one approach is best shown in FIGS. 1 and 2, wherein the textured, continuous, multi-filament polyester yarn 10 of FIG. 1 has incorporated the aforesaid plasticizer thereinto. It is contemplated that the technique of the present invention would also be applicable to blended yarns, formed predominantly of textured, continuous, multi-filament polyester yarn if desired, however, such yarns have not actually been tested.

In FIG. 2, there is illustrated schematically a conventional texturing process in which the multi-filament polyester yarn 10 is passed through a texturing apparatus 12, which apparatus may utilize any of the conventional texturing processes such as false twist texturing, air jet texturing, stuffer box texturing, edge crimping, gear crimping, and the like. After passing through the texturing apparatus 12, a guide system 14 directs the yarn 10 over a kiss roll 20, which kiss roll 20 is partially submerged in a trough 16 continuing the plasticizer 18 to be explained hereinafter. A second guide system 22 directs the chemically treated yarn along to a takeup package 24.

The plasticizer itself may be selected from one of several types, however, all must have certain common characteristics including: (1) making vinyl and polyester compatible with each other in a laminating operation; (2) tending to swell the vinyl matrix to better receive the polyester; (3) having a viscosity in the range of 25-150 centistokes; and (4) becoming active with the vinyl in a heat range of 150°-180° C. at a pressure of approximately 600 pound per linear inch.

It has been found that acceptable plasticizers include (1) diacid esters of fatty diacids and short chain alcohols; (2) diesters of fatty acids and short chain diol alcohols; and (3) ethoxylated alkyl aryl alcohols. Specific examples of each include respectively (1) di-tridecyl adipate; (2) 1,6 hexane diol dilaurate; and (3) Lurol 2405M by George A. Goulston, Inc. of Monroe, N.C.

The selected plasticizer is preferably introduced to the yarn during the texturing process as described and illustrated in FIG. 2. Alternatively, the plasticizer could be applied to the yarn in a separate operation; while the yarn is on the yarn package; or even after the yarn if woven into the gauze fabric. When intended for use as a substrate for vinyl, specifications require that the substrate be able to exhibit at least a 3.5 pound pull strength. Tests have shown that the use of quantities of plasticizer in the range of 0.5-10% (preferably 1.0-3.0%) by weight of yarn are adequate to achieve the 3.5 pound pull strength. In order to achieve a desired percentage of additive (plasticizer), the speed of the kiss roll 20 is controlled until the yarn denier of the yarn aftertreatment reaches the original denier plus the desired percentage increase.

The application of the surfactant swells the matrix in both the vinyl and, to a lesser extent, the textured, multi-filament polyester yarn. The plasticizer causes the vinyl to a greater extent and the polyester to a lesser extent to become tacky and bond together.

The treated yarn referred to hereinabove is formed into the gauze structure illustrated in FIG. 3. The weaving operation is preferably carried out on a fluid jet loom (water or air).

Figure 4:
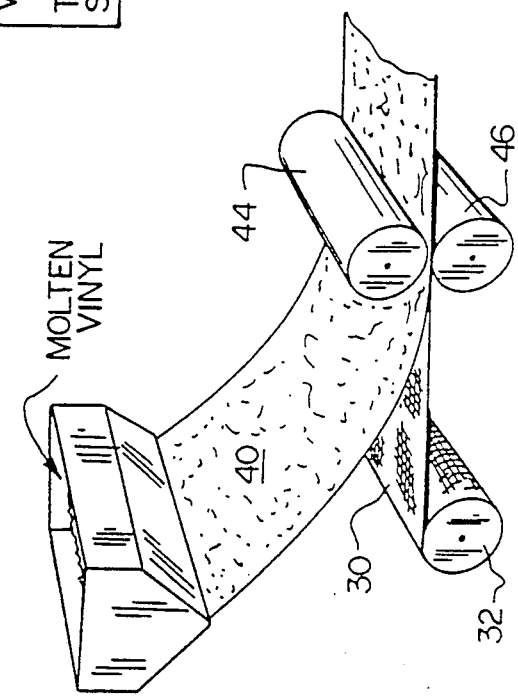
FIG. 4 is a schematic representation of a processing apparatus for forming a vinyl laminate with the gauze of FIG. 3 embedded therein.
Figure 3:
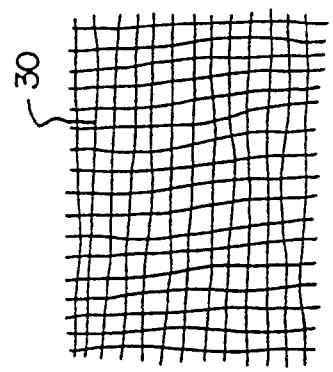
FIG. 3 is a plan view of a woven gauze substrate formed of the yarn of FIGS. 1 and 2.

The gauze substrate 30 illustrated in FIG. 3 is laminated into the vinyl sheet material 40 as best illustrated in FIG. 4. As the molten vinyl ("molten" here means thermoplastic) is extruded into a sheet material 40 (FIG. 4) and while the vinyl is still soft (thermoplastic), the gauze 30 which is being fed by feed roll 32 is directed onto one surface thereof. The vinyl sheet material and gauze 30 continue in contiguous arrangement through a pair of calendar rolls 44, 46 where the gauze is caused to be embedded in one surface of the sheet material 40. The calendar rolls 44, 46 are maintained at a temperature between 150 and 180° C. and at a pressure of 600 pounds per linear inch. The upper calendar roll may be provided with an embossed pattern to decorate the front surface of the vinyl sheeting 40, if desired.

Figure 5:
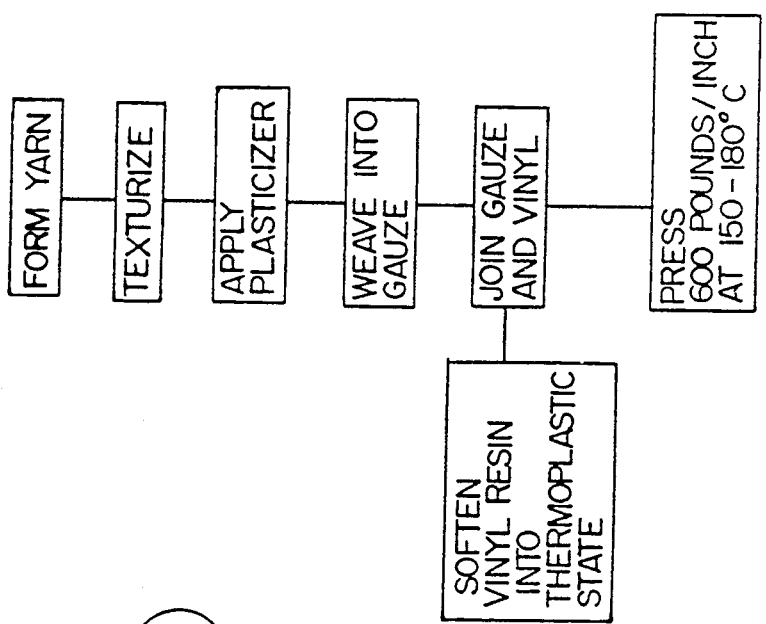
FIG. 5 is a flow chart describing the steps of the process of the present invention.

In FIG. 5, the entire process is summarized. While the yarn has been described herein as being used in the formation of a gauze substrate for vinyl products, the yarn itself may have other significant utilization. To the knowledge of the applicant, the yarn of the present invention is the first incident of a continuous, multi-filament polyester yarn being so treated in the yarn form by the use of a plasticizer as to be compatible with and bondable to vinyl products. Secondly, the gauze substrate may have application in other environments than the cited examples of vinyl upholstery and sheet materials. The polyester gauze, as a result of the present invention, can then be more easily embedded in and remain in a vinyl sheet material for any purpose. There has been described in detail hereinabove a preferred embodiment of the present invention. Some modifications have been cited specifically. Other modifications may come to mind. The present invention should be limited only by the following claims.

What is claimed is:

1. Improved guaze for use as a substrate with a vinyl material, said gauze comprising primarily textured, continuous, multi-filament, polyester polymeric yarns formed into a fabric, said yarns having a plasticizer incorporated into the interfilamentary structure thereof; said plasticizer having the characteristics of so softening vinyl when placed adjacent thereto and under heat and pressure, as to cause the polyester polymeric yarns to laminate to the vinyl and resist pull tests of at least 3.5 pounds.

2. The gauze according to claim 1 wherein said plasticizer is selected from the group containing diacid esters of fatty diacids and short chain alcohols, diesters of fatty acids and short chain diol alcohols, and ethoxylated alkyl aryl alcohols.

3. The gauze according to claim 1 wherein the viscosity of said plasticizer is in the range of 50-100 centistokes.

4. The gauze according to claim 1 wherein said plasticizer is present in said gauze in an amount in the range of 0.5-10% plasticizer to yarn weight.

5. The gauze according to claim 1 wherein said plasticizer in present in said gauze in an amount in the range of 1.0-3.0% plasticizer to yarn weight.

* * * * *